(12) United States Patent
Müller (10) Patent No.: US 6,733,866 B2
(45) Date of Patent: May 11, 2004

(54) MULTI-PLY TISSUE PAPER PRODUCT AND METHOD FOR PRODUCING SAME

(75) Inventor: Heinz-Jürgen Müller, Lampertheim (DE)

(73) Assignee: SCA Hygiene Products GmbH, Mannheim (DE)

( * ) Notice: Subject to any disclaimer, the term of this patent is extended or adjusted under 35 U.S.C. 154(b) by 7 days.

(21) Appl. No.: 10/170,425

(22) Filed: Jun. 14, 2002

(65) Prior Publication Data

US 2003/0026953 A1 Feb. 6, 2003

Related U.S. Application Data

(60) Provisional application No. 60/298,101, filed on Jun. 15, 2001.

(51) Int. Cl.[7] .............................. B32B 3/00; D06N 7/04
(52) U.S. Cl. ..................... 428/172; 428/154; 428/166; 428/212
(58) Field of Search ................................. 162/109, 111, 162/112, 113; 428/154, 166, 172, 212, 220, 537.5

(56) References Cited

U.S. PATENT DOCUMENTS

| 3,650,882 A | 3/1972 | Thomas |
| 3,953,638 A | 4/1976 | Kemp |
| 3,961,119 A | 6/1976 | Thomas |
| 4,100,017 A | 7/1978 | Flautt, Jr. |
| 4,978,565 A | * 12/1990 | Pigneul et al. .............. 428/156 |
| 5,382,464 A | 1/1995 | Ruppel et al. |
| 5,736,223 A | 4/1998 | Laurent |
| 6,129,972 A | * 10/2000 | McNeil et al. .............. 428/154 |
| 6,277,467 B1 | * 8/2001 | Dwiggins et al. .......... 428/156 |

FOREIGN PATENT DOCUMENTS

| EP | 1 081 284 A1 | 3/2001 |
| WO | 99/44814 | 9/1999 |
| WO | 99/45205 | 9/1999 |

* cited by examiner

Primary Examiner—Donald J. Loney
(74) Attorney, Agent, or Firm—Burns, Doane, Swecker & Mathis, LLP (57) ABSTRACT

A multi-ply tissue paper product (10) and a method for producing same, wherein multi-ply tissue paper includes at least three embossed plies (12, 14, 16) of paper, and a first outer ply (12) has a first microstructure pattern (18) with first protuberances with a density of more than 40 protuberances/cm². The second outer ply (14) is provided with a second microstructure pattern (22) also having a density of second protuberances of more than 40 protuberances/cm². A middle ply (16) is sandwiched between the first outer ply (12) and the second outer ply (14) and has a third structure pattern being an embossing pattern with a density of less than 40 protuberances/cm². All three plies are ply bonded (24) together after the first outer ply, the second outer ply and the middle ply have been structured separately.

18 Claims, 6 Drawing Sheets

MULTI-PLY TISSUE PAPER PRODUCT AND METHOD FOR PRODUCING SAME

CROSS-REFERENCE TO RELATED APPLICATIONS

The present application claims the priority of U.S. Provisional Application No. 60/298,101, filed in the United States on Jun. 15, 2001, the entire contents of which are hereby incorporated herein by reference.

BACKGROUND OF THE INVENTION

1. Field of the Invention

The invention relates to a multi-ply tissue paper product comprising at least three structured plies of paper and a method for producing same.

2. Description of Related Art

Multi-ply tissue paper for various uses as a kitchen paper, toilette paper or handkerchief involves a plurality of plies of paper which are bonded together to form a multi-ply paper.

General goals with respect to multi-ply paper are to provide softness, an improved feel, good mechanical strength and the desired absorption properties.

In multilayer products, tissue plies can be structured by different methods. A first method for providing a structured ply of paper is the use of a TAD (through air drying) process, which gives the paper a three-dimensional structure already in the paper machine.

A further method involves the embossing of tissue using a single nip or multi-nip embossing. The ply bonding of the single plies is provided by a mechanical embossing or by using an adhesive. In the case of three or multi-ply products, a plurality of plies are generally embossed together to provide a volume to the product. However, the embossing usually hardens the product and contributes to a rough feeling of the product. On the other hand, it is possible to use a micro embossing with a high density of protuberances of more than 40 protuberances/cm². A micro embossed product feels soft. However, micro embossed paper feels as if it could not absorb enough liquid.

Therefore, there is a constant desire to provide a tissue product with a high softness surface and a sufficient bulk.

WO 99/45205 describes a multi-ply tissue product with two embossed outer plies and a middle ply without embossing. The outer plies are embossed so that the protuberances are arranged with a density of more than 30 protuberances/cm². Each of the outer plies is glue bonded to the middle ply.

U.S. Pat. No. 5,382,464 and U.S. Pat. No. 5,736,223 both relate to specific nested configurations of a three-ply, embossed paper. The multi-ply paper according to U.S. Pat. No. 5,736,223 is composed of two external plies, the embossing protuberances of which are arranged in a foot-to-foot configuration. A third embossed middle ply is provided, the embossing protuberances of which nest between the protuberances of one of the two external plies. U.S. Pat. No. 5,382,464 uses a different approach by providing embossed plies having protuberances of two different heights wherein the protuberances having a greater height alternate with more shallow protuberances. When the embossed ply is used to form a multi-ply paper, the small protuberances are arranged in a foot-to-foot configuration with the protuberances of a second embossed ply, so that the big protuberances of the first ply are positioned to nest between the protuberances of the second ply.

OBJECTS AND SUMMARY

It is an object of the invention to provide a multi-ply tissue paper which combines in an advantageous way a high softness and a necessary bulk to provide a good feeling to the user. Moreover, the product should be appealing to the eye.

In one embodiment of the invention, there are at least three embossed plies of paper. Both outer plies are provided with a microstructure pattern with protuberances with a density (concentration) of more than 40 protuberances per cm². At least one middle ply sandwiched between the outer plies is provided with a third structure pattern being an embossing pattern with a density of the protuberances of less than 40 protuberances per cm². By bonding the outer, microstructured plies and the embossed middle ply together, the resulting multi-ply tissue paper combines soft outer plies and a volume producing middle ply. The resulting tissue paper combines the advantages of high softness, a high volume and a good ply bonding. Due to the volume generating embossing of the middle ply, there is a considerable saving of fibres which contributes to the cutting down of the production costs.

Another embodiment of the invention includes a method of producing a multi-ply tissue paper comprising the steps of structuring a first outer ply with a first microstructure pattern which has a first density of protuberances, the structuring of a second outer ply with a second microstructure pattern with a second density of the embossed protuberances and the embossing of a middle ply with a third structure pattern being an embossing pattern. Whereas the first and second pattern has a density of more than 40 protuberances per cm², the third pattern has a density of less than 40 protuberances per cm². When combining together the three plies so that the third pattern is in an unregistered way, the middle ply imparts volume to the multi-ply tissue whereas the two outer plies with the microstructure pattern contribute to the softness of the product.

According to a preferred embodiment, the first protuberances of the first microstructure pattern have a first height h1 and the second protuberances of the second microstructure pattern have a second height h2, wherein the protuberances of the third structure pattern have a height H which is at least 1.3 times greater than h1 and h2, respectively, preferably at least 1.5 times greater and most preferably at least 2.0 times greater than h1 and h2. This is a further measure to impart bulk to the middle ply and to a multi-ply tissue paper product.

Preferably, the first outer ply has a fourth structure pattern, preferably an embossing pattern with fourth protuberances having essentially the same height as the first protuberances of the first microstructure pattern. These fourth protuberances can be arranged so that a decorative pattern is formed which is appealing to the eye of the user. The same is possible for the second outer ply which can have a fifth structure pattern, preferably an embossing pattern with protuberances having essentially the same height as the second protuberances of the second microstructure pattern. It is possible to provide a free combination of multi-ply tissue paper with a decorative pattern on one or both outer surfaces. The fourth and fifth structure pattern can be essentially identical or can be different.

According to the preferred embodiment of the invention, the ply bonding is generated by glue lamination using a lamination pattern. The height of the lamination pattern must be the sum of the individual heights of the microstructure pattern of the outer plies (h1+h2) and the height of the third pattern (H). This ply bonding technique using a separate lamination pattern can be used to provide a design lamination to the product. It is possible to use, e.g., discreet design lamination dots which are arranged to resemble the shape of a desired design like a flower. In order to provide a good ply bonding in the inventive multi-ply tissue paper, the glue lamination is preferably deep embossed to provide a sufficient ply bonding despite of the volume embossed middle ply.

The adhesives used can be any adhesives usually used in the art, e.g., starch or polyvinylalcohol.

According to an alternative embodiment of the invention, the ply bonding is generated by a mechanical ply bonding technique. Such a mechanical ply bonding technique could be the pressing of the multi-ply tissue with some small protrusions on a roller, like needle-tips. These protrusions run with high pressure against a suitable anvil roller. This pressing provides for a ply bonding between the individual tissue paper plies. An example for such a mechanical ply bonding is edge embossing.

According to the preferred embodiment of the invention, the fourth and/or fifth protuberances have an elongate shape. With such an elongate shape, it is possible to provide a design pattern which is easier to discern for a user and, thus, more complicated designs can be provided on the same scale of the design pattern compared to the use of single dots to generate a design pattern.

However, the alternative use of fourth and/or fifth protuberances with a dot-like-shape is also possible if these protuberances are arranged in a way to form an aesthetic pattern.

According to preferred embodiments of the inventive method, the step of combining together the three plies so that the protuberances lie in an unregistered way can be carried out by first combining the first outer ply and the middle ply to a combined tissue web, the applying of a laminating agent to the combined tissue web and the marrying of the combined tissue web and the second outer ply. As outlined above, the lamination can be provided according to a preferred embodiment of the invention using a design pattern of lamination dots.

In the above described embodiments, at least one of the first and second outer plies is micro-embossed. Alternatively, one of the first and second outer plies is structured by a TAD process. In other words, all combinations of outer plies which are structured by a TAD process or micro-embossed are within the scope of the invention.

BRIEF DESCRIPTION OF THE DRAWINGS

In the following, the invention is described, by way of example only, with reference to the accompanying drawings, in which:

FIGS. 1a to 1d are diagrammatic illustrations of a tissue paper product according to a first embodiment of the invention, wherein

FIGS. 3a to 3d are diagrammatic illustrations of a tissue paper product according to a second embodiment of the invention, wherein

FIGS. 5a to 5d are diagrammatic illustrations of a tissue paper product according to a third embodiment of the invention, wherein

DETAILED DESCRIPTION OF PREFERRED EMBODIMENTS

In the following description of the preferred embodiments of the invention, corresponding parts or elements in the different drawings will be denoted by the same reference numerals. In the schematic drawings according to FIGS. 1a, 3a and 5a, the heights of the protuberances were selected to clarify the invention and are not drawn to scale.

In the following embodiments, the outer plies are micro-embossed. However, it should be apparent to those skilled in the art that it is also possible to structure one or both outer plies using a TAD process.

FIGS. 1a to 1d describe a first embodiment of a three ply tissue paper product which can be used as toilet paper, a kitchen roll, or a handkerchief. However, the use of the multi-ply tissue paper is not limited to these exemplified uses. Same applies to the number of plies in all exemplified embodiments which is not limited to three. If it is desired to provide more bulk it is easily possible to add one or more further volume embossed middle plies to the product.

Figure 1A:
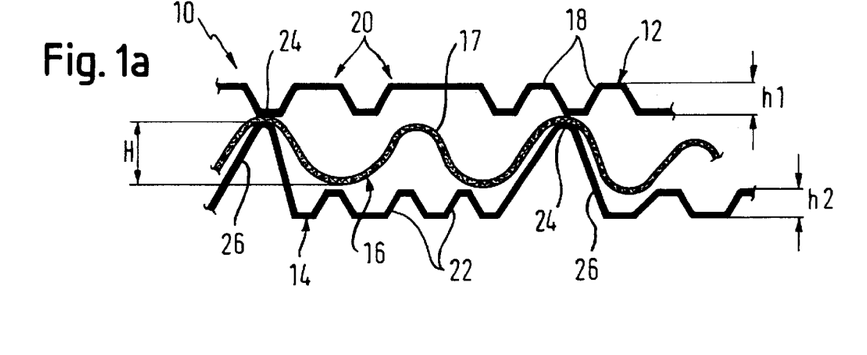
FIG. 1a is a cross-sectional view of the three-ply tissue product along the lines A—A in FIGS. 1b to 1d.
Figure 1B:
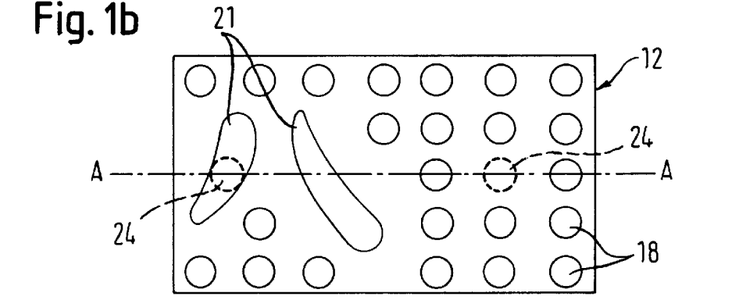
FIGS. 1b, 1c and 1d show the outer ply, middle ply and inner ply, respectively
Figure 1C:
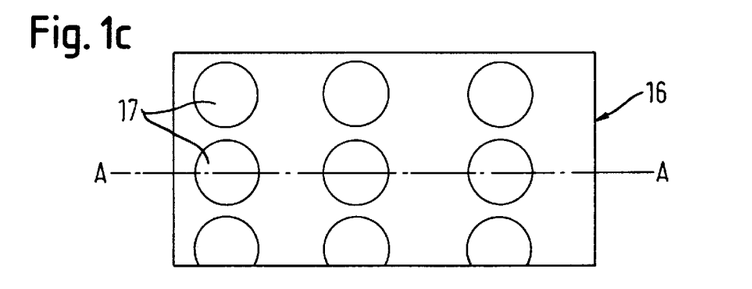
Figure 1D:
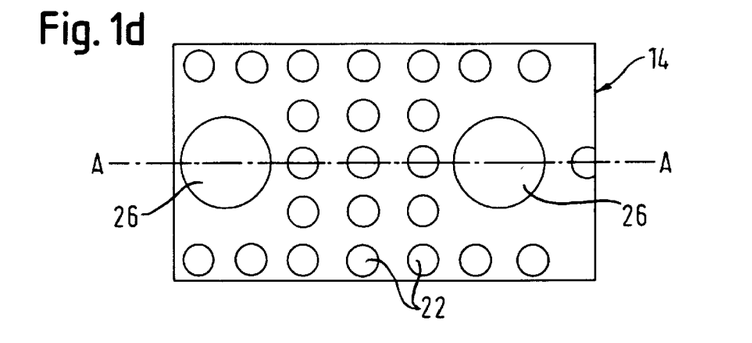

FIG. 1b shows the first outer ply from above, whereas FIG. 1d shows the second outer ply from below.

In the embodiment according to FIG. 1a, there are first and second outer plies which, in the product 10 according to FIG. 1a, are the first outer ply 12 and the second outer ply 14.

Between the first outer ply 12 and the second outer ply 14 there is sandwiched a middle ply 16, the protuberances of which are not in registration with the protuberances of the first outer ply 12 and the second outer ply 14. The first outer ply 12 and the second outer ply 14 are also combined so that a random configuration of the micro embossing pattern described later on the first outer ply 12 and the second outer ply 14 results.

As can be best seen from FIGS. 1a and 1b, the first outer ply 12 is provided with a first micro embossing pattern 18 in the shape of little protrusions having a height h1 of between 0.1 and 1.5 mm, and more preferably between 0.1 to 1.0 mm. The density of the protuberances of the first micro embossing pattern 18 is greater than 40 protuberances/cm$^2$, preferably greater than 60 protuberances/cm$^2$.

The first outer ply 12 is additionally provided with a graphic embossing pattern 21 having the same heights h1 as the first micro embossing pattern 18. The graphic embossing pattern 21 can either be formed by elongate protuberances which act as a line or by discrete dot-like protuberances which are assembled to form an aesthetic pattern.

The second outer ply 14 (see also FIG. 1d) is provided with a second micro embossing pattern 22 having a height h2 which can be different than the height h1. In any case, the height h2 is preferably between 0.1 and 1.5 mm and, preferably between 0.1 and 1.0 and therefore, in the same range as the height h1. The second outer ply 14 could also have an additional embossing pattern.

In the example according to FIGS. 1a, 1d, the second outer ply 14 is not provided with an additional graphic embossing pattern. The micro embossing pattern of the second outer ply 14 has a density of the protuberances of greater than 40 protuberances/cm$^2$ and preferably greater than 60 protuberances/cm$^2$.

The middle ply 16 according to FIG. 1c is also provided with an embossing. The embossing with a height H has a big embossing pattern 17 with a density of the protuberances of less than 40 protuberances per cm2.

The height H ranges between 0.3 and 3.0 mm and preferably between 0.7 and 2.5 mm.

In a preferred embodiment of the invention, the volume embossing of the middle ply has a density of about 30 protuberances/cm$^2$ in combination with a density of the micro embossing pattern of the first outer ply and second outer ply of about 60 protuberances/cm$^2$.

As outlined above, the middle ply is not in registration with the first or second outer plies 14 so that a random configuration of the individual protuberances in the three plies occur.

The ply bonding is performed by using small lamination dots 24 in combination with a small lamination embossing pattern 26 which is applied from the second outer ply 14.

Figure 2:
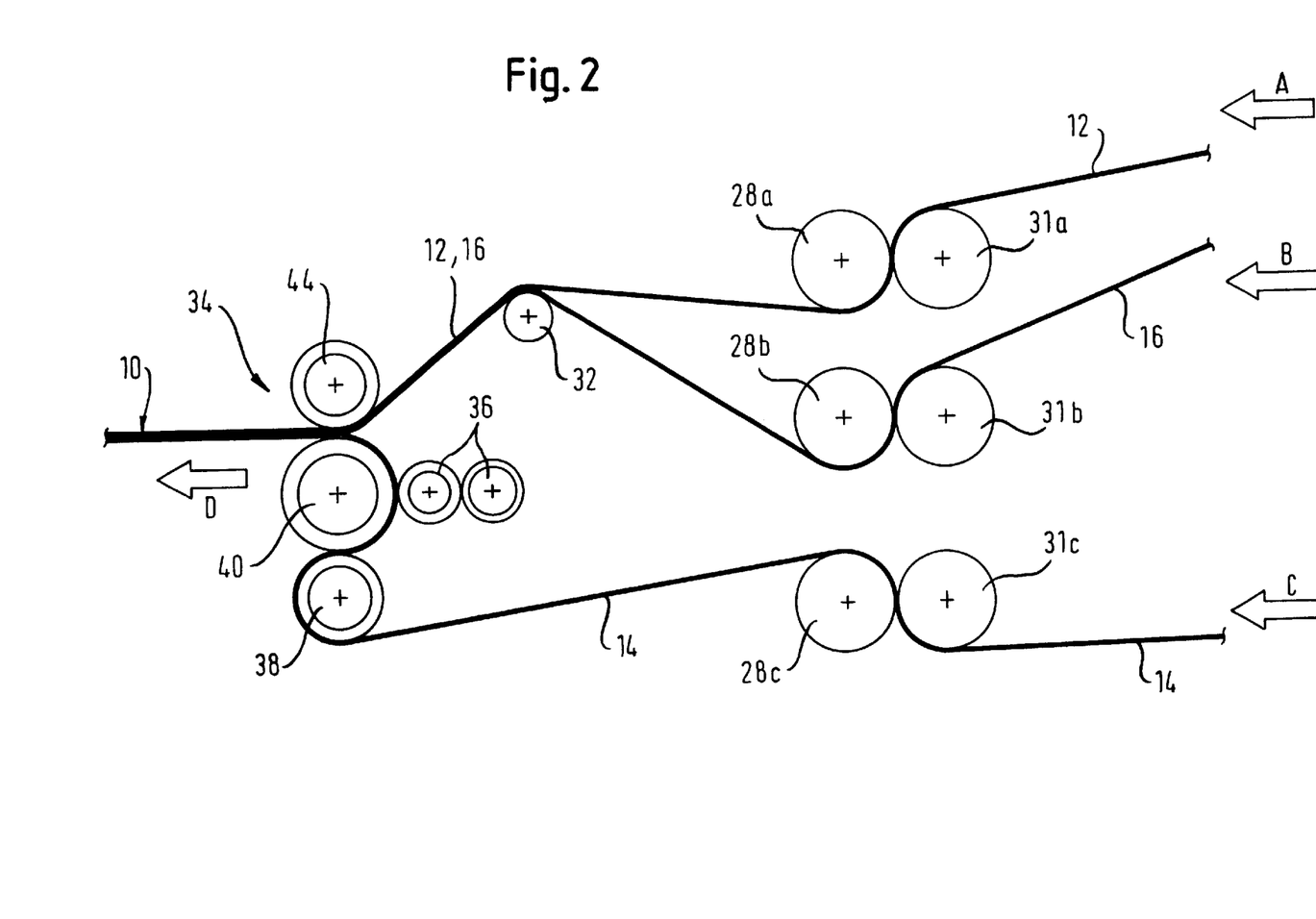
FIG. 2 is a schematic representation of a paper converting device for producing the multi-ply tissue paper product according to FIG. 1.

The manufacturing method of the product 10 according to FIG. 1a is schematically described in FIG. 2. The first outer ply 12, middle ply 16 and second outer ply 14 are fed to the apparatus in the direction of arrows A, B and C. The first outer ply 12, middle ply 16 and second outer ply 14 are separately embossed between a pair of rollers wherein a usual combination of rollers, like a rubber rollers 31a, 31b, 31c in cooperation with steel rollers 28a, 28b, 28c is used. The tissue plies are embossed in the nip between the corresponding rubber roller and engraved steel roller.

The embossing pattern for the three different plies is different for the product shown in FIG. 1a. Wherein the second outer ply 14 is provided with an micro embossing pattern only, the middle ply is volume embossed with a higher height of the protuberances and a lower density of protuberances per area and the first outer ply is both provided with a micro embossing pattern with geometrically regularly oriented small protuberances and a design pattern to provide the first outer ply with a design distributed in a regular pattern over the surface of the first outer ply 12.

The volume embossed middle ply 16 and the micro embossed and design embossed first outer ply 12 are combined together by means of a roller 32 whereas the second outer ply 14 is separately fed around a rubber anvil roller 38 and through the nip between the rubber anvil roller 38 and a lamination embossing roller 40 with a lamination embossing pattern 26 at a lamination station 34 where a small lamination embossing pattern for the subsequent ply bonding with the first outer ply 12 and middle ply 16 is made. The application of the adhesive by means of the rollers 36 can be carried out using a standard technique.

The second outer ply 14 and the combined first outer ply and middle ply 12, 16 are brought in contact to another and bonded together between a marrying roller 44 and a lamination embossing roller 40 with a lamination embossing pattern. The combined three ply tissue product 10 leaves the apparatus in the direction of arrow D.

Figure 3A:
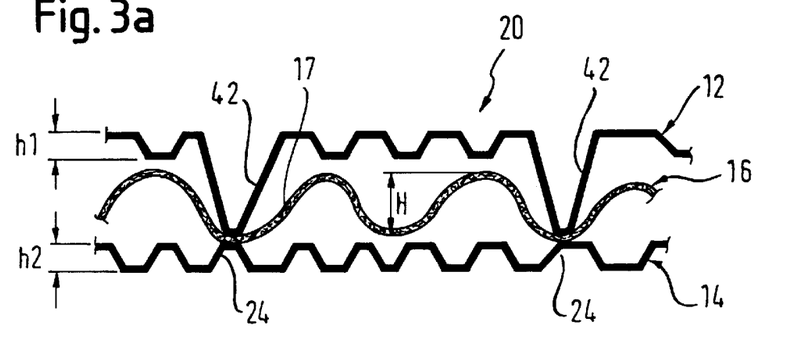
FIG. 3a is a cross-sectional view of the three-ply tissue product along the lines B—B in FIGS. 3b to 3d.
Figure 3B:
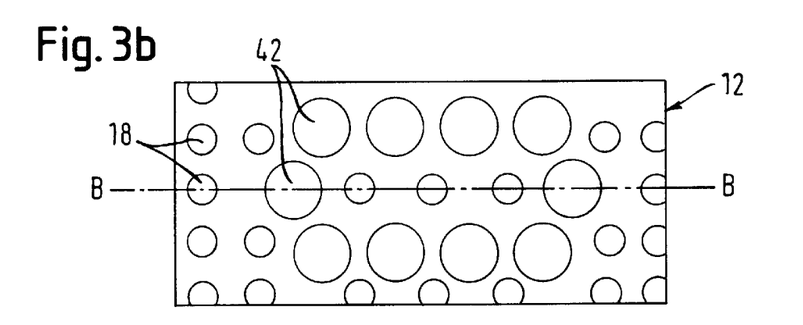
FIGS. 3b, 3c and 3d show the outer ply, middle ply and inner ply, respectively
Figure 3C:
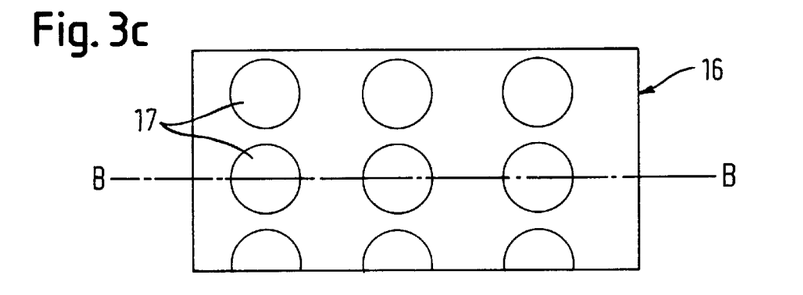
Figure 3D:
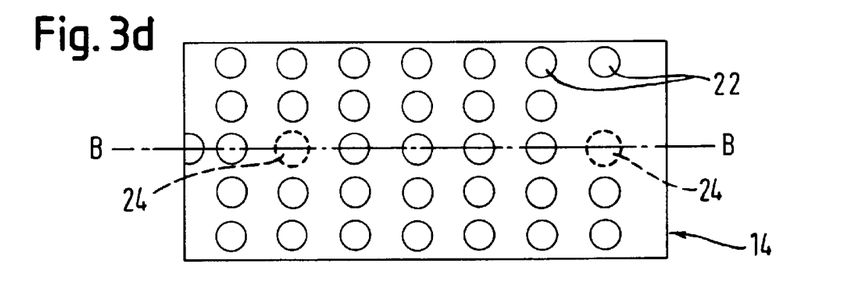

FIGS. 3a to 3d relate to a further product according to a slightly different embodiment of the invention. However, the same elements as those shown in FIGS. 1a to 1d are given the same reference numerals. The second outer ply 14 according to FIG. 3d is micro embossed corresponding to the micro embossing pattern explained in more detail for the product 10 above. The middle ply 16 according to FIG. 3c is also volume embossed with a big embossing pattern having a density of the protuberances of less than 40 dots/cm$^2$. The first outer ply 12 according to FIG. 3b is embossed both with the micro embossing pattern 18 and a design pattern having a height h1. The difference between the product 10 diagrammatically shown in FIG. 1a above and product 20 according to the present embodiment lies in the ply bonding used. There is a separate ply bonding using a deep embossed design 42, e.g., with discrete flower design lamination dots or with deep spots.

Figure 4:
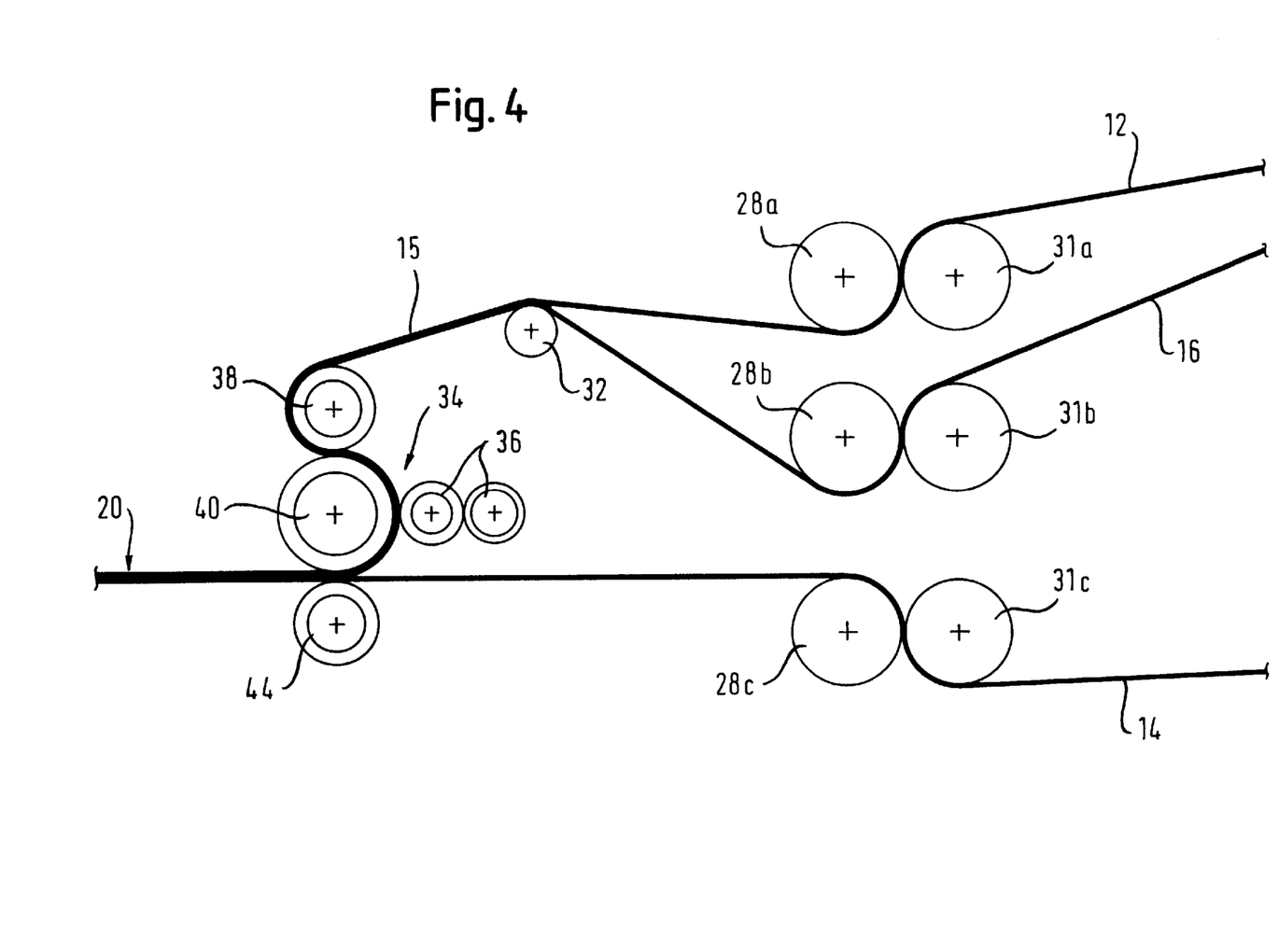
FIG. 4 is a schematic representation of a paper converting device for producing the multi-ply tissue paper product according to FIG. 3.

As can be best seen from a comparison between FIGS. 2 and 4, the first outer ply 12 and the middle ply 16 are created in a similar way to that already described in connection with FIG. 2. The difference resides in that the pair of rollers 28a and 31a only impart a micro embossing pattern to the outer ply 12 but no graphic pattern additionally to that. The first outer ply 12 and middle ply 16 are combined at the roller 32 to a combined, two-ply web 15 which passes between a rubber roller 38 and a lamination embossing roller 40 with a lamination embossing pattern which are parts of the lamination station 34 also comprising with the lamination rollers 36. In this lamination station the lamination is performed with a desired design, e.g., flowers. Then the two-ply intermediate product 15 is combined with the second outer ply 14 which is brought in contact to the two-ply intermediate product 15 between the spot lamination roller and a further marrying roller 44.

The difference between the products 10 and 20 resides in that in the product 10 according to FIG. 1a, the first outer ply is provided with a micro embossing and a graphic embossing, and the second outer ply is provided with a micro embossing and a lamination pattern, whereas in the product 20 according to FIG. 3a, the second outer ply is only micro embossed and the decorative or graphic embossing in the first outer ply 12 is performed by way of the design lamination dots 42.

Figure 5A:
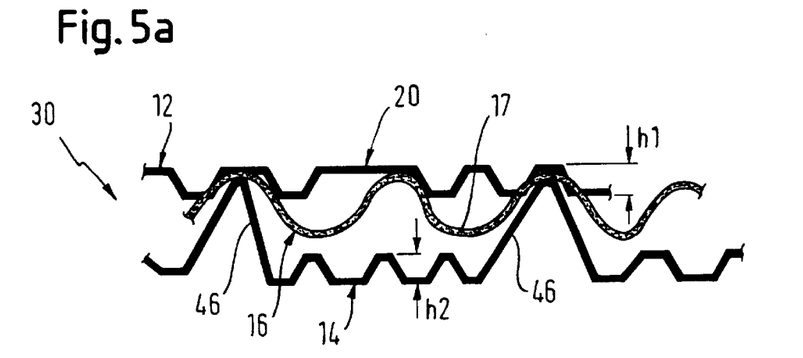
FIG. 5a is a cross-sectional of the three-ply tissue product along the lines C—C in FIGS. 5b to 5d.
Figure 5B:
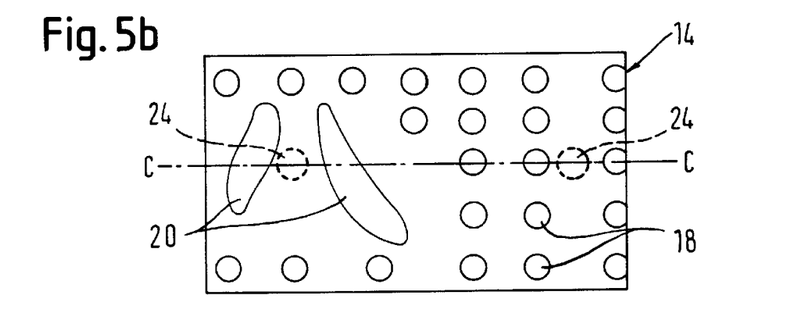
FIGS. 5b, 5c and 5d show the outer ply, middle ply and inner ply, respectively
Figure 5C:
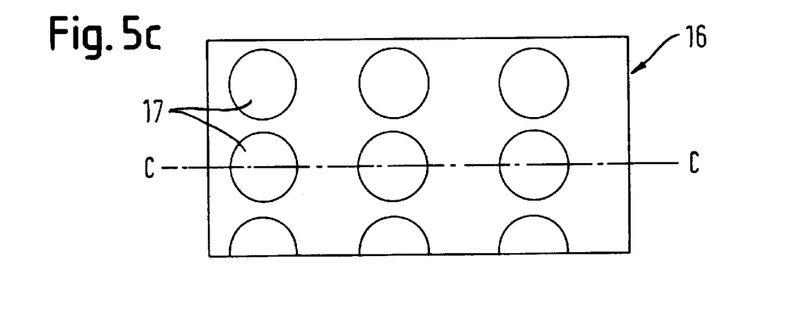

FIGS. 5a to 5d show another embodiment of the invention. The first outer ply 12 of the product 30 according to FIG. 5b is provided with a micro embossing pattern 18 and, additionally, a graphic pattern 21 both of which have the height h1. The density of the protuberances of the micro embossing pattern corresponds to that of the products 10 and 20 according to FIGS. 1a and 3a.

Figure 5D:
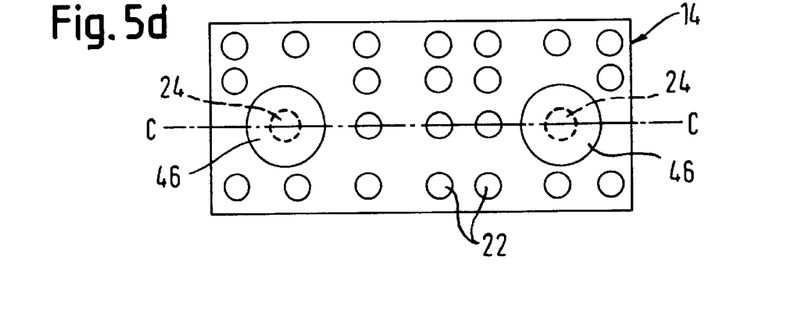

The second outer ply 14 according to FIG. 5d is also provided with a micro embossing pattern with a height h2 and under the same conditions as outlined above with reference to FIGS. 1a to 1d. Same applies to the middle ply 16 according to FIG. 5c which is volume embossed with a big embossing pattern with a density of the protuberances 17 of less than 40 protuberances/cm$^2$ and preferably in a range of 30 protuberances/cm$^2$. The first outer ply 12 has an additional design embossing pattern 21 which is diagrammatically shown in FIG. 5b by the broad protuberances 21 which can be elongate or dot-like.

The ply bonding of the product 30 is generated without the use of an adhesive. The mechanical ply bonding system by means of which the three plies are bonded together in the regions 46 uses small needles or spikes to press together the three plies.

Figure 6:
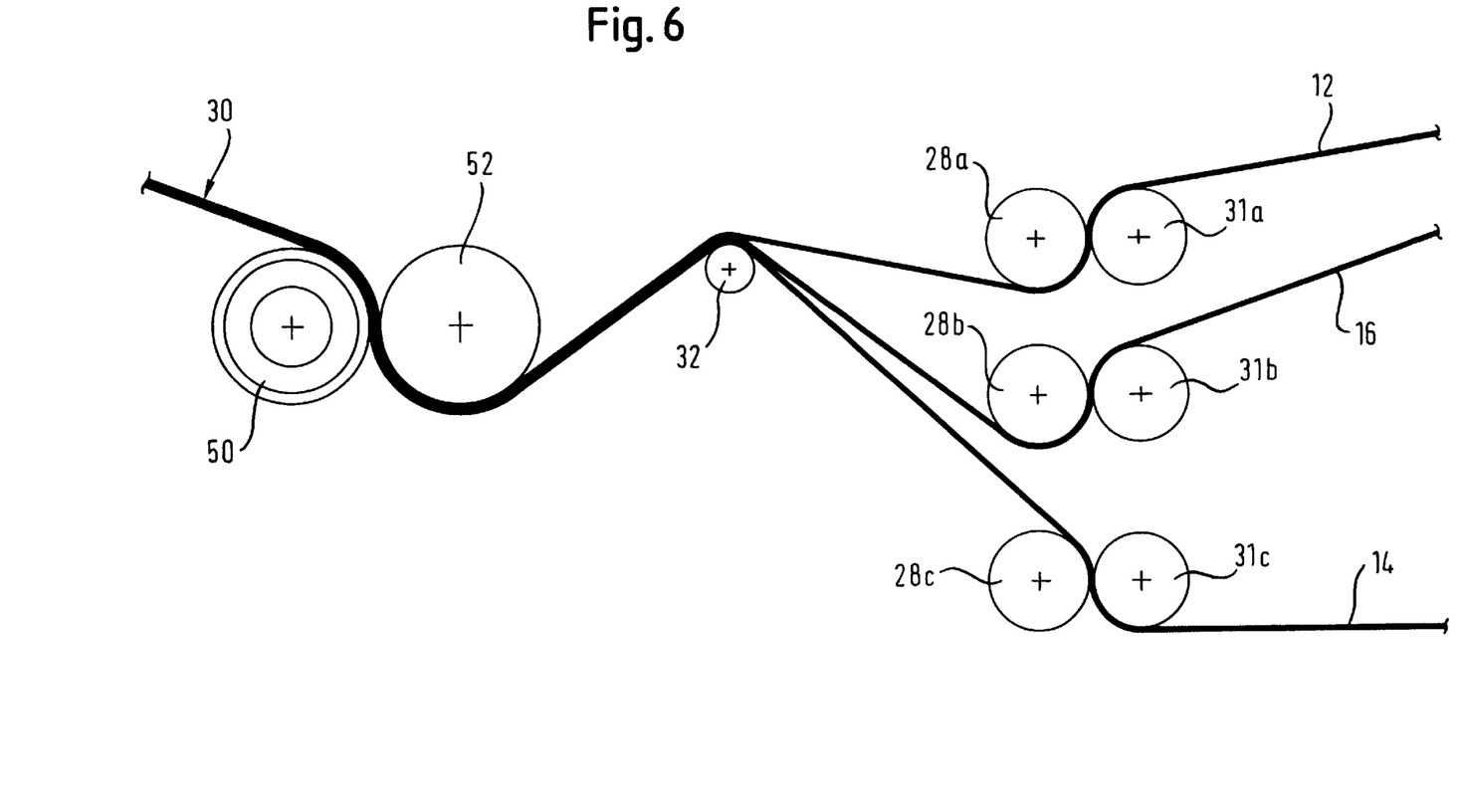
FIG. 6 is a schematic representation of a paper converting device for producing the multi-ply tissue paper product according to FIG. 5.

FIG. 6 gives the schematic production process of the three ply product 30 shown in FIG. 5a. The first outer ply 12, middle ply 16 and second outer ply 14 are all provided with a desired embossing pattern. The first outer ply 12 receives a micro embossing pattern and, additionally, a design pattern, both of which are applied in the nip between a steel engraved roller 28*a* and a rubber roller 31*a*. The middle ply 16 is volume embossed between a steel roller 28*b* and a rubber roller 31*b* and the second outer ply 14 is only provided with a micro embossing pattern by means of a steel roller 28*c* cooperating with a rubber roller 31*c*. All three separately embossed plies are combined at the roller 32 and receive the mechanical ply bonding in the nip between a structured steel embossing roller 50 and a corresponding counter roller 52. The counter roller 52 can be a smooth steel roller. The structured steel embossing roller can be provided with needle-like protrusions which press together the combined three-ply tissue paper and generate a mechanical ply bonding to the product 30 before leaving the apparatus.

In all embodiments, the height H of the middle ply can be at least 1.3 times greater than the heights h1, h2 of the first outer ply or second outer ply, respectively, and preferably 1.5 times greater and most preferably 2.0 times greater than the heights h1, h2 of the first and second outer plies.

All above described embodiments have in common that the multi-ply tissue paper product is a combination of micro embossed first and second outer plies in combination with a middle ply which is volume embossed using a big embossing pattern. The three plies are combined in an unregistered way wherein different types of ply bonding and different types of graphic embossing can be used. In general, the micro-embossed outer plies provide softness to the multi-ply product, whereas the volume-embossed middle ply generates bulk to the product.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A multi-ply tissue paper product, comprising:
    at least three structured plies of paper;
    a first outer ply with a first microstructure pattern with first protuberances with a first density of more than 40 protuberances/cm$^2$;
    a second outer ply with a second microstructure pattern with second protuberances with a second density of more than 40 protuberances/cm$^2$;
    at least one middle ply sandwiched between the first outer ply and the second outer ply with a third structure pattern being an embossed pattern with third protuberances with a density of less than 40 protuberances/cm$^2$; wherein
        the first and second outer plies and the at least one middle ply are ply bonded together in a non-registered manner.

2. The multi-ply tissue paper product according to claim 1, wherein the first microstructure pattern has first protuberances with a first height h1 and the second microstructure pattern has second protuberances with a second height h2; wherein the protuberances of the third structure pattern have a height H which is at least 1.3 times greater than h1 and h2, respectively.

3. The multi-ply tissue paper product according to claim 1, wherein the first microstructure pattern has first protuberances with a first height h1 and the second microstructure pattern has second protuberances with a second height h2; wherein the protuberances of the third structure pattern have a height H which is at least 1.5 times greater than h1 and h2, respectively.

4. The multi-ply tissue paper product according to claim 1, wherein the first microstructure pattern has first protuberances with a first height h1 and the second microstructure pattern has second protuberances with a second height h2; wherein the protuberances of the third structure pattern have a height H which is at least 2.0 times greater than h1 and h2, respectively.

5. The multi-ply tissue paper product according to claim 1, wherein the first outer ply has a fourth structure pattern with fourth protuberances having essentially the same height as the first protuberances of the first micro structure pattern.

6. The multi-ply tissue paper product according to claim 5, wherein the second outer ply has a fifth structure pattern with fifth protuberances having essentially the same height as the second protuberances of the second microstructure pattern.

7. The multi-ply tissue paper product according to claim 6, wherein the fourth and fifth structure pattern are essentially identical.

8. The multi-ply tissue paper product according to claim 6, wherein the fourth and fifth structure pattern are different than each other.

9. The multi-ply tissue paper product according to claim 5, wherein the fourth and fifth protuberances have an elongate shape.

10. The multi-ply tissue paper product according to claim 5, wherein the fourth protuberances have an elongate shape.

11. The multi-ply tissue paper product according to claim 5, wherein the fifth protuberances have an elongate shape.

12. The multi-ply tissue paper product according to claim 5, wherein the fourth and fifth protuberances have a dot-like shape arranged in a way to form an aesthetic pattern.

13. The multi-ply tissue paper product according to claim 5, wherein the fourth protuberances have a dot-like shape arranged in a way to form an aesthetic pattern.

14. The multi-ply tissue paper product according to claim 5, wherein the fifth protuberances have a dot-like shape arranged in a way to form an aesthetic pattern.

15. The multi-ply tissue paper product according to claim 1, wherein the ply bonding is generated by adhesive lamination using a lamination pattern.

16. The multi-ply tissue paper product according to claim 1, wherein ply bonding is generated by a mechanical ply bonding technique.

17. The multi-ply tissue paper product according to claim 1, wherein at least one of the first and second outer plies is a TAD-paper.

18. The multi-ply tissue paper according to any of claim 1, wherein at least one of the first and the second outer plies is micro-embossed.

* * * * *